United States Patent
Chung (10) Patent No.: US 11,767,013 B2
(45) Date of Patent: Sep. 26, 2023

(54) APPARATUS FOR PREDICTING RISK OF COLLISION OF VEHICLE AND METHOD OF CONTROLLING THE SAME

(71) Applicants: HYUNDAI MOTOR COMPANY, Seoul (KR); KIA CORPORATION, Seoul (KR)

(72) Inventor: Seunghwan Chung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 189 days.

(21) Appl. No.: 17/242,960

(22) Filed: Apr. 28, 2021

(65) Prior Publication Data

US 2022/0073065 A1 Mar. 10, 2022

(30) Foreign Application Priority Data

Sep. 8, 2020 (KR) .......................... 10-2020-0114381

(51) Int. Cl.
*B60W 40/04* (2006.01)
*B60W 30/095* (2012.01)

(52) U.S. Cl.
CPC ........ *B60W 30/0956* (2013.01); *B60W 40/04* (2013.01); *B60W 2420/52* (2013.01);
(Continued)

(58) Field of Classification Search
CPC ............. B60W 30/0956; B60W 40/04; B60W 2552/00; B60W 2552/53;
(Continued)

(56) References Cited

U.S. PATENT DOCUMENTS 11,097,724 B2* 8/2021 Maeda ................... G08G 1/163
11,275,382 B2* 3/2022 Hashimoto .......... G05D 1/0223
(Continued)

FOREIGN PATENT DOCUMENTS

| CN | 109774711 | * | 5/2019 |
| KR | 20150128066 | * | 5/2014 |
| KR | 10-2018-0070376 A | | 6/2018 |

OTHER PUBLICATIONS

Xiang Zhang, "Estimation of the Lateral Distance between Vehicle and Lanes Using Convolutional Neural Network and Vehicle Dynamics", Dec. 6, 2018, Applied Sciences (Year: 2018).*

*Primary Examiner* — Elaine Gort
*Assistant Examiner* — Matthias S Weisfeld
(74) *Attorney, Agent, or Firm* — Morgan, Lewis & Bockius LLP (57) ABSTRACT

A vehicle for predicting a risk of collision includes a controller configured to: calculate distances between the vehicle and left and right lines of a first lane, respectively, using a position of the vehicle and first lane width information of the first lane, calculate distances between the surrounding vehicle and left and right lines of a second lane, respectively, using a position of the surrounding vehicle and second lane width information of the second lane, calculate a second distance between the vehicle and the surrounding vehicle by reflecting the calculated distances between the vehicle and the left and right lines of the first lane or the calculated distances between the surrounding vehicle and the left and right lines of the second lane to a first distance, and predict a risk of collision between the vehicle and the surrounding vehicle based on the second distance.

20 Claims, 9 Drawing Sheets

(52) U.S. Cl.
CPC ..... *B60W 2520/10* (2013.01); *B60W 2520/12* (2013.01); *B60W 2552/00* (2020.02); *B60W 2552/53* (2020.02); *B60W 2554/801* (2020.02); *B60W 2554/802* (2020.02)

(58) Field of Classification Search
CPC ..... B60W 2554/802; B60W 2554/801; B60W 2420/52; B60W 2520/10; B60W 2520/12
USPC .......................................................... 701/25
See application file for complete search history.

(56) References Cited

U.S. PATENT DOCUMENTS

| | | | |
|---|---|---|---|
| 2017/0004365 A1* | 1/2017 | Ono | B60K 35/00 |
| 2017/0316684 A1* | 11/2017 | Jammoussi | G08G 1/0112 |
| 2018/0267548 A1* | 9/2018 | Sumioka | G05D 1/0214 |
| 2020/0010088 A1* | 1/2020 | Kokaki | B60W 30/143 |
| 2020/0265247 A1* | 8/2020 | Musk | G06V 20/584 |
| 2020/0369270 A1* | 11/2020 | Antonsson | B60W 30/162 |
| 2021/0197809 A1* | 7/2021 | Trukhanovich | G06T 7/70 |

* cited by examiner

APPARATUS FOR PREDICTING RISK OF COLLISION OF VEHICLE AND METHOD OF CONTROLLING THE SAME

CROSS-REFERENCE TO RELATED APPLICATION(S)

This application is based on and claims the benefit of priority to Korean Patent Application No. 10-2020-0114381, filed on Sep. 8, 2020 in the Korean Intellectual Property Office, the disclosure of which is incorporated herein by reference.

TECHNICAL FIELD

The present disclosure relates to a vehicle capable of predicting a risk of collision with a surrounding vehicle using various distance and width information, and a method of controlling the vehicle.

BACKGROUND

An autonomous driving system of a vehicle refers to a system that automatically drives to a given destination by recognizing a road environment by itself, determining a driving situation, and controlling the vehicle according to a planned driving path. In a case of the autonomous driving systems, unlike a navigation, detailed maps at a lane level are required, but such maps require a lot of construction cost, and when applying an existing navigation algorithm with only the detailed maps, it takes a lot of time to calculate an initial path.

In addition, the detailed maps for autonomous vehicles must have high accuracy and contain a lot of information, and therefore, there is a problem that it is difficult to build nationwide due to the high cost of construction.

The information included in this Background section is only for enhancement of understanding of the general background of the present disclosure and may not be taken as an acknowledgement or any form of suggestion that this information forms the prior art already known to a person skilled in the art.

SUMMARY

An aspect of the disclosure is to provide a vehicle that calculates a distance between the vehicle and surrounding vehicles by calculating a distance between the vehicle and a right lane and a distance between the vehicle and a left lane by setting full width information of the vehicle, a virtual line and a virtual point on outskirts of the vehicle, and a method of controlling the vehicle.

Another aspect of the disclosure is to provide a vehicle that determines a risk of collision by more accurately calculating the distance between the vehicle and surrounding vehicles by applying a weight to the distance between the vehicle and both lanes of the lane in which the vehicle is driving according to a vehicle speed and a curvature of the road, and a method of controlling the vehicle.

Additional aspects of the disclosure will be set forth in part in the description which follows and, in part, will be obvious from the description, or may be learned by practice of the disclosure.

According to an aspect of the disclosure, there is provided a vehicle including: a detector configured to detect a position of the vehicle and a first distance between the vehicle and a surrounding vehicle; and a controller configured to calculate distances between the vehicle and left and right lines of a first lane, respectively, in which the vehicle drives using the position of the vehicle and first lane width information of the first lane, to calculate distances between the surrounding vehicle and left and right lines of a second lane, respectively, in which the surrounding vehicle drives using a position of the surrounding vehicle and second lane width information of the second lane, to calculate a second distance between the vehicle and the surrounding vehicle by reflecting the calculated distances between the vehicle and the left and right lines of the first lane and the calculated distances between the surrounding vehicle and the left and right lines of the second lane to the first distance, and to predict a risk of collision between the vehicle and the surrounding vehicle based on the second distance.

The controller may be configured to calculate the distances between the vehicle and the both lanes of the road on which the vehicle drives, respectively, using first full width information of the vehicle, and to calculate the distances between the surrounding vehicle and the both lanes of the road on which the surrounding vehicle drives, respectively, using second full width information of the surrounding vehicle.

The controller may be configured to apply a weight to at least one of the distances between the vehicle and the both lanes and the distances between the surrounding vehicle and the both lanes.

The controller may be configured to determine the weight using at least one of a vehicle speed and a curvature of the road.

The controller may be configured to calculate the distances between the vehicle and the both lanes of the road on which the vehicle drives, respectively, by setting at least one of a first virtual line and a first virtual point on the outskirts of the vehicle, and to calculate the distances between the surrounding vehicle and the both lanes of the road on which the surrounding vehicle drives, respectively, by setting at least one of a second virtual line and a second virtual point on the outskirts of the surrounding vehicle.

The controller may be configured to automatically set lengths of the first virtual line and the second virtual line based on the vehicle speed, and to set the lengths of the first virtual line and the second virtual line when the vehicle speed is less than or equal to a predetermined speed to be smaller than the lengths of the first virtual line and the second virtual line when the vehicle speed is greater than or equal to the predetermined speed.

The controller may be configured to set the lengths of the first virtual line and the second virtual line when the curvature of the road on which the vehicle drives is less than or equal to a predetermined curvature to be smaller than the lengths of the first virtual line and the second virtual line when the curvature of the road is greater than or equal to the predetermined curvature.

The controller may be configured to predict that the risk of collision is low in a case where the second distance is greater than a first predetermined value.

The controller may be configured to determine whether the distance between the vehicle and the left lane and the distance between the vehicle and the right lane is maintained for a predetermined time based on the vehicle in a case where the second distance is less than a first predetermined value.

The controller may be configured to predict that the risk of collision is high in a case where it is determined that the distance to the lane is maintained for the predetermined time.

According to another aspect of the disclosure, there is provided a method of controlling a vehicle including: detecting a first distance between the vehicle and a surrounding vehicle using a radar; calculating, by a controller, distances between the vehicle and left and right lines of a first lane, respectively, in which the vehicle drives, using the position of the vehicle and first lane width information of the road on which the vehicle drives; calculating, by the controller, distances between the surrounding vehicle and left and right lines of a second lane, respectively, in which the surrounding vehicle drives, using a position of the surrounding vehicle and second lane width information of the road on which the surrounding vehicle drives; calculating, by the controller, a second distance between the vehicle and the surrounding vehicle by reflecting the calculated distances between the vehicle and the left and right lines of the first lane and the calculated distances between the surrounding vehicle and the left and right lines of the second lane to the first distance; and predicting, by the controller, a risk of collision between the vehicle and the surrounding vehicle based on the second distance.

The method may further include calculating, by the controller, the distances between the vehicle and the both lanes of the road on which the vehicle drives, respectively, using first full width information of the vehicle; and calculating, by the controller, the distances between the surrounding vehicle and the both lanes of the road on which the surrounding vehicle drives, respectively, using second full width information of the surrounding vehicle.

The method may further include applying, by the controller, a weight to at least one of the distances between the vehicle and the both lanes and the distances between the surrounding vehicle and the both lanes.

The method may further include determining, by the controller, the weight using at least one of a vehicle speed and a curvature of the road.

The method may further include calculating, by the controller, the distances between the vehicle and the both lanes of the road on which the vehicle drives, respectively, by setting at least one of a first virtual line and a first virtual point on the outskirts of the vehicle; and calculating, by the controller, the distances between the surrounding vehicle and the both lanes of the road on which the surrounding vehicle drives, respectively, by setting at least one of a second virtual line and a second virtual point on the outskirts of the surrounding vehicle.

The method may further include automatically setting, by the controller, lengths of the first virtual line and the second virtual line based on the vehicle speed; and setting, by the controller, the lengths of the first virtual line and the second virtual line when the vehicle speed is less than or equal to a predetermined speed to be smaller than the lengths of the first virtual line and the second virtual line when the vehicle speed is greater than or equal to the predetermined speed.

The method may further include setting, by the controller, the lengths of the first virtual line and the second virtual line when the curvature of the road on which the vehicle drives is less than or equal to a predetermined curvature to be smaller than the lengths of the first virtual line and the second virtual line when the curvature of the road is greater than or equal to the predetermined curvature.

The method may further include predicting, by the controller, that the risk of collision is low in a case where the second distance is greater than a first predetermined value.

The method may further include determining, by the controller, whether the distance between the vehicle and the both lanes is maintained for a predetermined time in a case where the second distance is less than a first predetermined value.

The method may further include predicting, by the controller, that the risk of collision is high in a case where it is determined that the distance to the lane is maintained for the predetermined time.

BRIEF DESCRIPTION OF THE DRAWINGS

These and/or other aspects of the disclosure will become apparent and more readily appreciated from the following description of the embodiments, taken in conjunction with the accompanying drawings.

DETAILED DESCRIPTION

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

Figure 1:
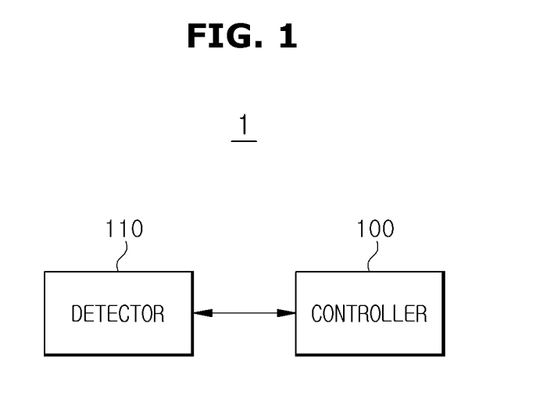
FIG. 1 is a control block diagram of a vehicle according to an embodiment of the disclosure.

FIG. 1 is a control block diagram of a vehicle according to an embodiment of the disclosure.

Referring to FIG. 1, a vehicle 1 may include a detector 110 that detects a position of the vehicle 1 and a first distance between the vehicle 1 and a surrounding vehicle, and the position of the vehicle 1, and a controller 100. The controller 100 may calculate distances between the vehicle 1 and both lines of a road on which the vehicle 1 drives, respectively, using the position of the vehicle 1 and a first lane width of the road on which the vehicle 1 drives, calculate distances between the surrounding vehicle and both lines on which the surrounding vehicle drives, respectively, using a position of the surrounding vehicle and a second lane width of the road on which the surrounding vehicle drives, calculate a second distance between the vehicle 1 and the surrounding vehicle by reflecting the calculated distance between the vehicle 1 and the both lanes and the calculated distance between the surrounding vehicle and the both lanes to the first distance, and predict a risk of collision between the vehicle 1 and the surrounding vehicle based on the second distance.

The detector 110 may detect the position of the vehicle 1. The detector 110 may detect the distance between the vehicle 1 and the surrounding vehicle driving on a lane next to the vehicle 1.

In the present disclosure, the detector 110 may be various sensors including infrared (IR), Radio Detection and Ranging (RADAR), camera, Lidar Detection and Ranging (Li-DAR), navigation systems, etc. For instance, the detector 110 may detect positions corresponding to the left or right side of the surrounding vehicle by using a radar, and detect the distance between the vehicle 1 and the surrounding vehicle by selecting the position on the left or right side of the surrounding vehicle close to the vehicle 1 among the positions corresponding to the left or right side of the detected surrounding vehicle. However, a method of detecting the distance between the vehicle 1 and the surrounding vehicle is not limited thereto.

The detector 110 may store the first distance corresponding to the distance between the vehicle 1 and the surrounding vehicle detected using the radar in a memory, and it may be stored in various ways.

The controller 100 may set at least one of a first virtual line or a first virtual point based on geometry information of the vehicle 1.

The controller 100 may set the first virtual point on the outskirts of the vehicle 1 and set the first virtual point on the outskirts of the first virtual line set on the outskirts of the vehicle 1.

The controller 100 may set at least one of a second virtual line and a second virtual point based on geometry information of the vehicle 1.

The controller 100 may set the second virtual point on the outskirts of the surrounding vehicle and set the second virtual point on the outskirts of the second virtual line set on the outskirts of the surrounding vehicle.

The controller 100 may calculate a distance between the vehicle 1 and a left line of the lane in which the vehicle 1 drives, and may calculate a distance between the vehicle 1 and a right line of the lane in which the vehicle 1 drives.

The controller 100 may calculate the distance between the vehicle 1 and the surrounding vehicle using at least one of the first lane width of the road on which the vehicle 1 drives, a first full width of the vehicle 1, and position information of the vehicle 1.

The controller 100 may calculate the distance between the vehicle 1 and the surrounding vehicle using at least one of second lane width information of the road on which the surrounding vehicle drives, first full width information of the surrounding vehicle, and position information of the surrounding vehicle.

Hereinafter, a method of calculating the distance between the vehicle 1 and the surrounding vehicle by the controller 100 will be described.

The controller 100 may determine whether or not the vehicle 1 is driving in a deflected lane using the first full width information of the vehicle 1.

The controller 100 may determine whether or not the surrounding vehicle is driving in a deflected lane using second full width information of the surrounding vehicle.

The controller 100 may set the first virtual line that is larger than the vehicle 1 and smaller than a width of the road on which the vehicle 1 drives based on the geometry information of the vehicle 1.

Here, the controller 100 may set the first virtual point along the outskirts of the vehicle 1 based on the geometry information. In this case, there may be a plurality of first virtual points, and the number of the first virtual points is not limited.

The controller 100 may calculate distances between the vehicle 1 and the left side of the road on which the vehicle 1 drives, respectively, using the first virtual point and the first full width information based on the first virtual line of the vehicle 1.

The controller 100 may automatically set lengths of the first virtual line and the second virtual line based on the speed of the vehicle 1.

The controller 100 may set the length of the first virtual line when the speed of the vehicle 1 is less than or equal to a predetermined speed to be smaller than the length of the first virtual line when the speed of the vehicle 1 is greater than or equal to the predetermined speed.

The controller 100 may set the length of the first virtual line when a curvature of the road on which the vehicle 1 drives is less than or equal to a predetermined curvature to be smaller than the length of the first virtual line when the curvature of the road is greater than or equal to the predetermined curvature.

The controller 100 may set the second virtual line that is larger than the surrounding vehicle and smaller than a width of the road on which the surrounding vehicle drives based on the geometry information of the surrounding vehicle.

Here, the controller 100 may set the first virtual point along the outskirts of the surrounding vehicle based on the geometry information. In this case, there may be a plurality of second virtual points, and the number of the second virtual points is not limited.

The controller 100 may calculate the distances between the surrounding vehicle and the left side of the road on which the surrounding vehicle drives, respectively, using the second virtual point and the second full width information based on the second virtual line of the surrounding vehicle.

The controller 100 may set the length of the second virtual line when the speed of the surrounding vehicle is less than or equal to the predetermined speed to be smaller than the length of the second virtual line when the speed of the surrounding vehicle is greater than or equal to the predetermined speed.

The controller 100 may set the length of the second virtual line when a curvature of the road on which the surrounding vehicle drives is less than or equal to the predetermined curvature to be smaller than the length of the second virtual line when the curvature of the road is greater than or equal to the predetermined curvature.

The controller 100 may transmit a signal for requesting a first distance between the vehicle 1 and the surrounding vehicle to the detector 110 to the detector 110 or the memory.

The controller 100 may receive the first distance between the current vehicle 1 and the surrounding vehicle from the detector 110 or the memory.

The controller 100 may apply a weight to the distance between the vehicle 1 and the left lane and the right lane of the road on which the vehicle 1 drives. Here, the controller 100 may determine and apply the weight using at least one of the speed of the vehicle 1 or the curvature of the road on which the vehicle 1 drives.

In more detail, the controller 100 may determine a weight of the vehicle 1 when the speed of the vehicle 1 is greater than or equal to a predetermined speed, and the curvature of the road on which the vehicle 1 drives is greater than the predetermined curvature as a value that is relatively larger than a weight when the speed of the vehicle 1 is less than or equal to the predetermined speed and the curvature of the road on which the vehicle 1 drives is smaller than the predetermined curvature.

For example, when there is the surrounding vehicle driving in the left lane of the vehicle 1, the controller 100 may calculate a sum of the distance between the vehicle 1 and the left lane and the distance between the surrounding vehicle and the right lane. The controller 100 may apply the weight to the calculated sum.

The controller 100 may reflect the distance between the vehicle 1 to which the weight is applied and the both lanes and the distance between the surrounding vehicle to which the weight is applied and the both lanes to the received first distance.

The controller 100 may calculate a second distance using the first distance in which the distance between the vehicle 1 to which the weight is applied and the both lanes and the distance between the surrounding vehicle to which the weight is applied and the both lanes are reflected.

For example, when there is the surrounding vehicle driving in the left lane of the vehicle 1, the controller 100 may calculate a sum A+B of a distance A between the vehicle 1 and the left lane and a distance B between the surrounding vehicle and the right lane. The controller 100 may multiply the calculated sum A+B by a weight K.

The controller 100 may compare the second distance with a first predetermined value.

When the second distance is larger than the first predetermined value, the controller 100 may determine that the second distance between the vehicle 1 and the surrounding vehicle is large, and thus may predict that the risk of collision between the vehicle 1 and the surrounding vehicle is low.

When the second distance is smaller than the first predetermined value, the controller 100 may determine the distance between the vehicle 1 and the left lane and the distance between the vehicle 1 and the right lane are maintained for a predetermined time based on the vehicle 1.

When the distances are maintained longer than the predetermined time, the controller 100 may determine that the second distance between the vehicle 1 and the surrounding vehicle is maintained to be small, i.e. equal to or smaller than a reference distance, and thus may predict that the risk of collision between the vehicle 1 and the surrounding vehicle is high.

When is the distances are not maintained for the predetermined time, the controller 100 may determine that the second distance between the vehicle 1 and the surrounding vehicle is not kept small, i.e., greater than the reference distance, and thus may predict that the risk of collision between the vehicle 1 and the surrounding vehicle is low.

The controller 100 may be implemented with a memory storing an algorithm to control operation of the components in the vehicle 100 or data about a program that implements the algorithm, and a processor configured to perform the aforementioned operation using the data stored in the memory. The memory and the processor may be implemented in separate chips. Alternatively, the memory and the processor may be implemented in a single chip.

The memory may store a variety of data used by at least one component (controller 100 and/or processor) of the vehicle 100, for example, input data or output data for a software program and instructions related thereto. The memory may include a volatile memory and/or a non-volatile memory.

Figure 2:
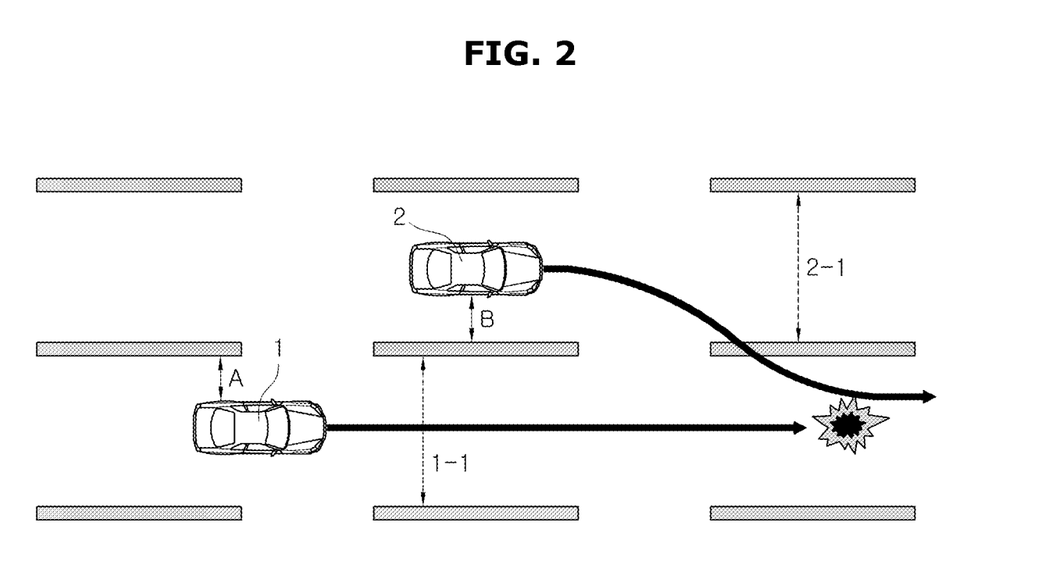
FIG. 2 is a view for predicting a risk of collision of a vehicle according to an embodiment of the disclosure.

FIG. 2 is a view for predicting a risk of collision of a vehicle according to an embodiment of the disclosure.

FIG. 2 illustrates a view for predicting a risk of collision between the vehicle 1 and a surrounding vehicle 2. The vehicle 1 may predict the risk of collision between the vehicle 1 and the surrounding vehicle 2 using at least one of information about a lane width (1-1) of the road on which the vehicle 1 drives, information about a lane width (2-1) of the road on which the surrounding vehicle 2 drives, current position information of the vehicle 1, and the current position information of the surrounding vehicle 2.

Here, the vehicle 1 may receive the current position information of the vehicle 1 from the detector 110, and may receive the position information of the surrounding vehicle 2 from the surrounding vehicle 2.

In more detail, the vehicle 1 may calculate the position of the vehicle 1 with respect to the road on which the vehicle 1 drives by reflecting the received position information of the vehicle 1 based on the lane width (1-1) information of the road on which the vehicle 1 drives.

The vehicle 1 may calculate the position of the surrounding vehicle 2 with respect to the road on which the surrounding vehicle 2 drives by reflecting the received position information of the surrounding vehicle 2 based on the lane width (2-1) information of the road on which the surrounding vehicle 2 drives.

Figure 3A:
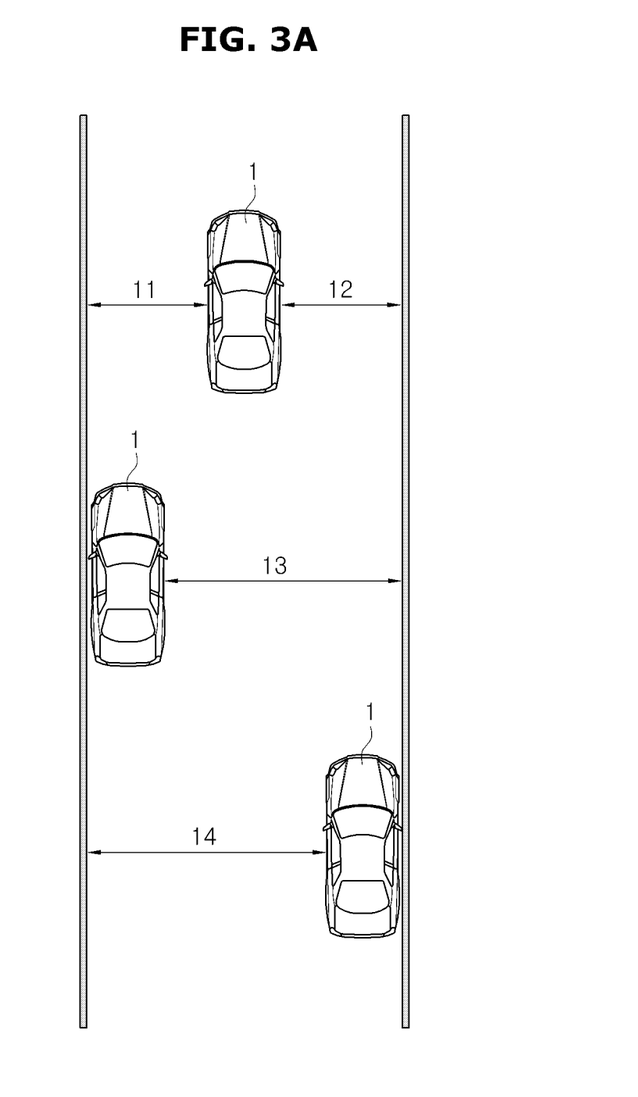
FIG. 3A is a view illustrating a situation for predicting a risk of collision of a vehicle according to an embodiment of the disclosure.

FIG. 3A is a view illustrating a situation for predicting a risk of collision of a vehicle according to an embodiment of the disclosure.

FIG. 3A illustrates a driving situation of the vehicle 1 for determining whether the vehicle 1 performs a deflective driving such that the vehicle 1 is adjacent to the left side or the right side based on the road on which the vehicle 1 drives.

Referring to FIG. 3A, when the lane width of the road on which the vehicle 1 drives is 3 meters, and the first full width of the vehicle 1 is 1 meter, the vehicle 1 may determine that the vehicle 1 performs the deflective driving according to the distance between the vehicle 1 and the both lanes.

The vehicle 1 may calculate that a distance 11 between the vehicle 1 and the left lane is 1 meter by using the position information of the vehicle 1, the lane width of the vehicle 1, and a first full width value of the vehicle 1, and may calculate that a distance 12 between the vehicle 1 and the right lane is 1 meter.

In this case, the vehicle 1 may determine that the vehicle 1 does not perform the deflective driving according to the distance between the vehicle 1 and the both lanes.

The vehicle 1 may calculate that the distance between the vehicle 1 and the left lane is 0 meter by using the position information of the vehicle 1, the lane width of the vehicle 1, and the first full width value of the vehicle 1, and may calculate that a distance 13 between the vehicle 1 and the right lane is 2 meters.

In this case, the vehicle 1 may determine that the vehicle 1 is adjacent to the left side and does not perform the deflective driving according to the distance between the vehicle 1 and the both lanes.

The vehicle 1 may calculate that the distance between the vehicle 1 and the right lane is 0 meter by using the position information of the vehicle 1, the lane width of the vehicle 1, and the first full width value of the vehicle 1, and may calculate that a distance 14 between the vehicle 1 and the left lane is 2 meters.

In this case, the vehicle 1 may determine that the vehicle 1 is adjacent to the right side and does not perform the deflective driving according to the distance between the vehicle 1 and the both lanes.

Figure 3B:
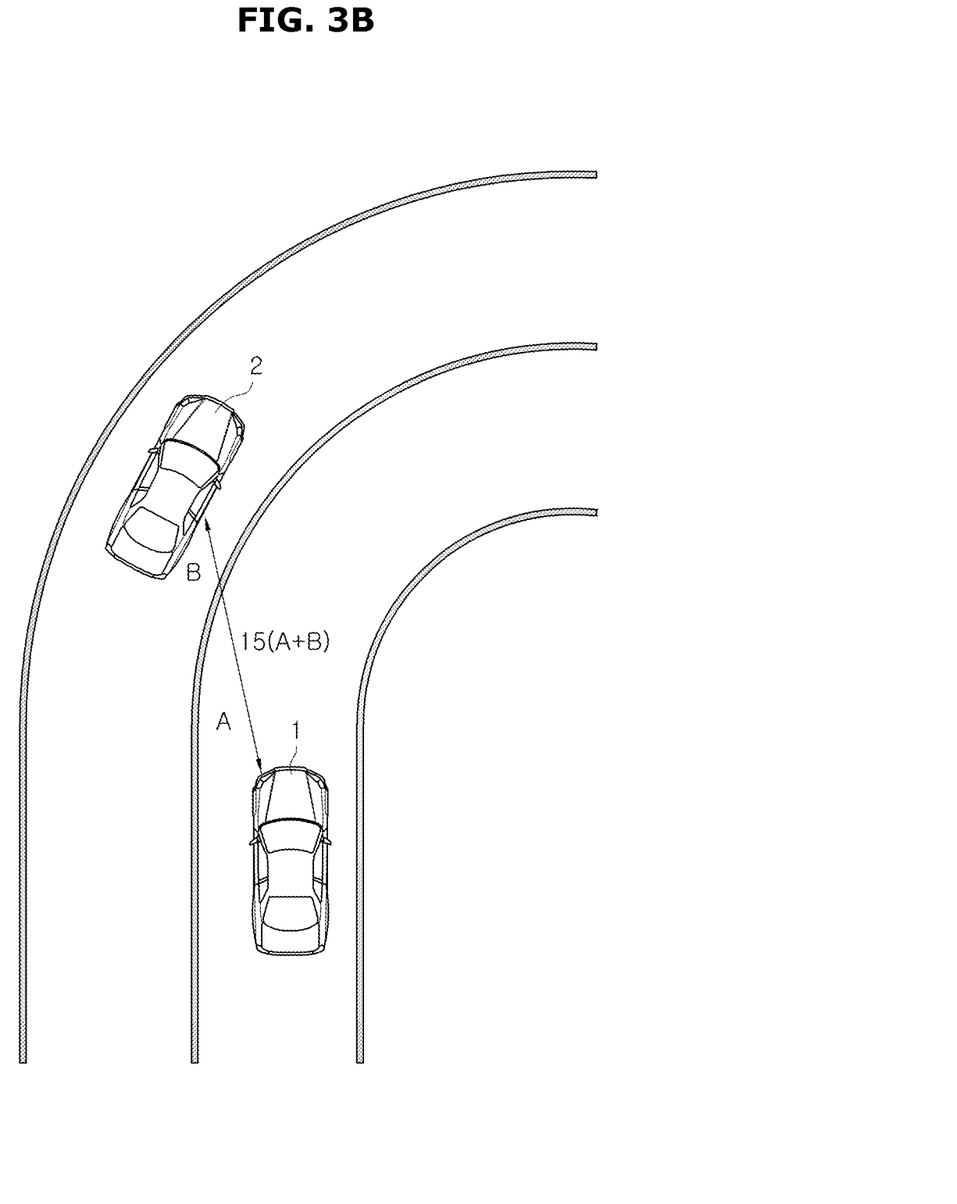
FIG. 3B is a view illustrating a method of calculating a distance between a vehicle and a surrounding vehicle according to an embodiment of the disclosure.

FIG. 3B is a view illustrating a method of calculating a distance between a vehicle and a surrounding vehicle according to an embodiment of the disclosure.

Referring to FIG. 3B, the vehicle 1 may calculate the distance 15 between the vehicle 1 and the surrounding vehicle 2 when the road on which the vehicle 1 drives is a curved road.

The vehicle 1 may calculate the distance A between the vehicle 1 and the left lane, calculate the distance B between the surrounding vehicle 2 and the right lane, and calculate the sum A+B of the distance A between the vehicle 1 and the left lane and the distance B between the surrounding vehicle 2 and the right lane.

The vehicle 1 may apply the weight to the sum A+B of the calculated distances.

The vehicle 1 may receive the first distance between the vehicle 1 and the surrounding vehicle 2 detected by the detector 110, and may calculate the second distance between the vehicle 1 and the surrounding vehicle 2 by reflecting the sum A+B of the distances to which the weight is applied to the first distance.

For example, when the distance A between the vehicle 1 and the left lane is 1 meter, the distance B between the surrounding vehicle 2 and the right lane is 1 meter, the weight is 0.5, and the distance corresponding to the first distance is 10 meters, the second distance may be calculated as 10+0.5*(1+1)=11.

Figure 4A:
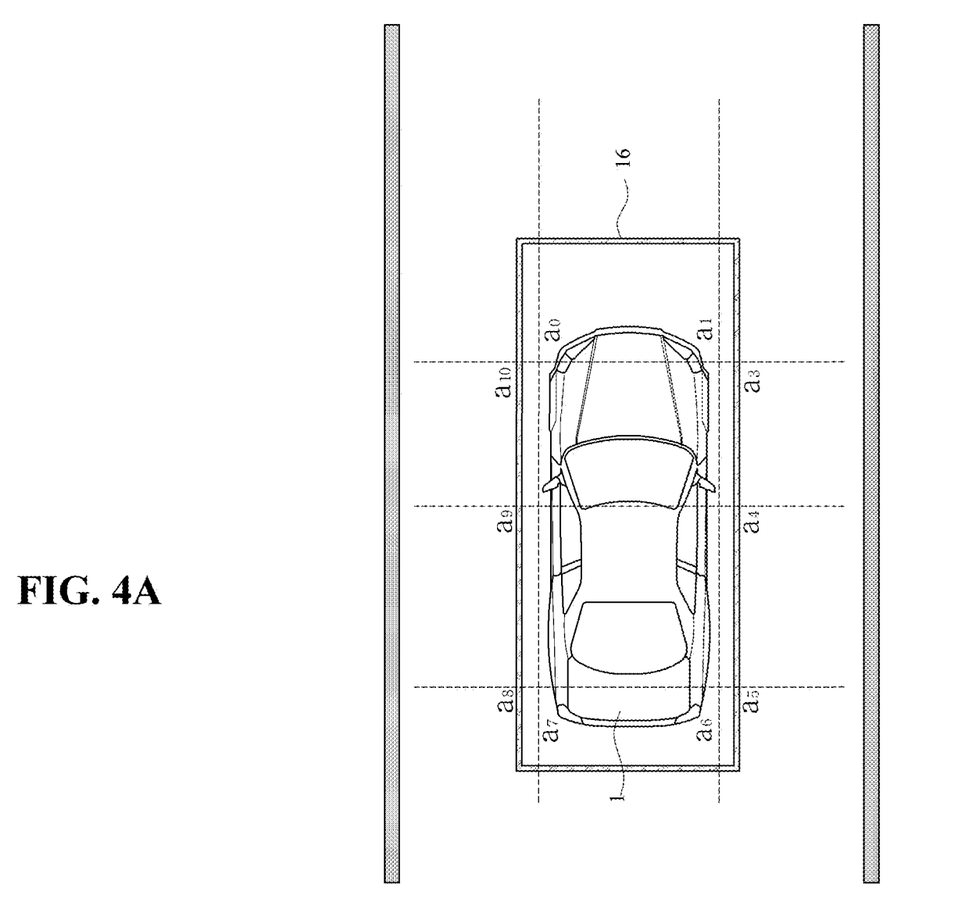
FIGS. 4A and 4B are views illustrating a method of calculating a distance between a vehicle and a surrounding vehicle according to another embodiment of the disclosure.
Figure 4B:
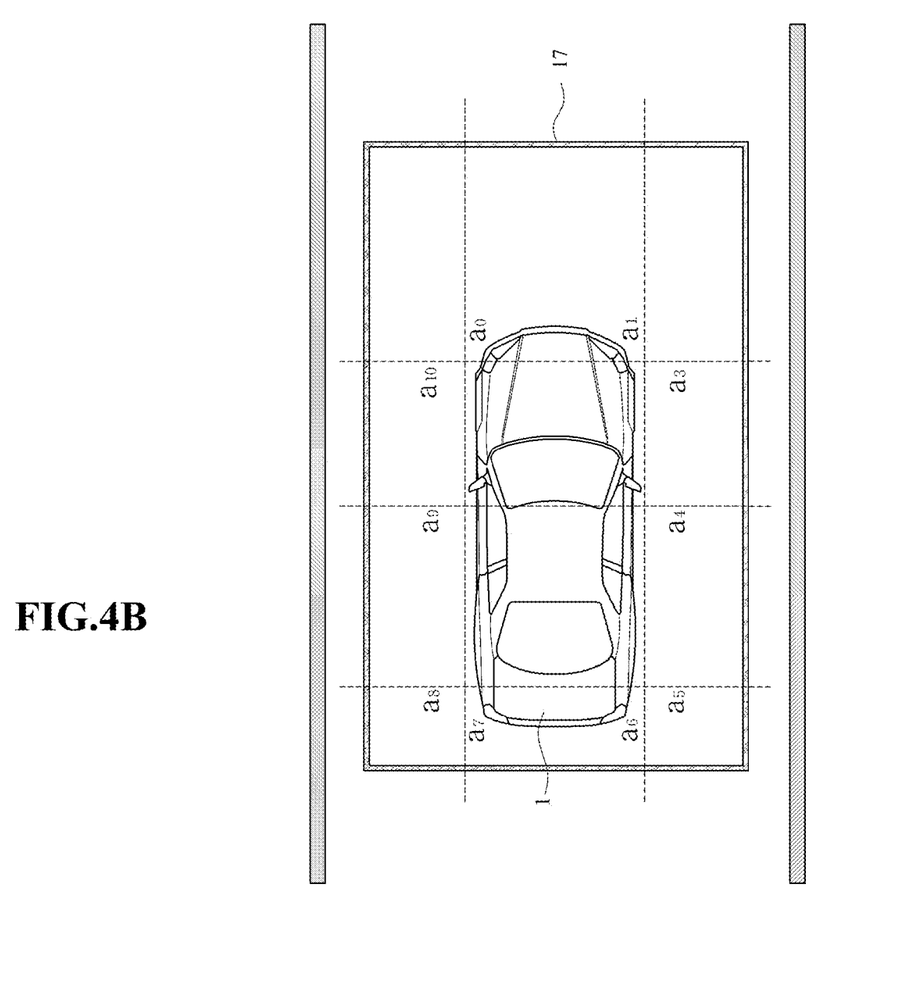

FIGS. 4A and 4B are views illustrating a method of calculating a distance between a vehicle and a surrounding vehicle according to another embodiment of the disclosure.

As illustrated in FIGS. 4A and 4B, the vehicle 1 may set the virtual point and the virtual line based on the coordinates based on outer geometry information of the vehicle 1.

The vehicle 1 may set first virtual points a1 to a10 on the outskirts of the vehicle 1 and set first virtual lines 16 and 17 on the outskirts of the vehicle 1. In an embodiment of the disclosure, the number of first virtual points a0 to a10 is set to 10, but the number is not particularly limited.

On the other hand, although not illustrated, the vehicle 1 may set the second virtual point on the outskirts of the surrounding vehicle driving on a side lane, and may set the second virtual line on the outskirts of the surrounding vehicle.

The vehicle may calculate the distances between the vehicle 1 and the both lanes of the road on which the vehicle 1 drives, respectively, using at least one of the first virtual line 16 and 17 or the virtual points a0 to a10.

For example, the vehicle 1 may calculate the coordinates of the virtual points a1 to a10 using at least one of the first full width information of the vehicle 1, the lane width information of the road on which the vehicle 1 drives, and the position information of the vehicle 1, and calculate the distance between the vehicle 1 and the right lane based on the first virtual points a3, a4, and a5.

For example, the vehicle 1 may calculate the coordinates of the virtual points a1 to a10 using at least one of the first full width information of the vehicle 1, the lane width information of the road on which the vehicle 1 drives, or the position information of the vehicle 1, and calculate the distance between the vehicle 1 and the left lane based on the first virtual points a8, a9, and a10.

Although not illustrated, it goes without saying that the vehicle 1 may calculate the coordinates of the second virtual point using at least one of the second full width information of the surrounding vehicle, the lane width information of the road on which the surrounding vehicle drives, or the position information of the surrounding vehicle, and may calculate the distances between the surrounding vehicle and the both lanes of the road on which the surrounding vehicle drives, respectively, using the second virtual point.

The vehicle 1 may set a virtual line 16 when the speed of the vehicle 1 is less than or equal to the predetermined speed to be smaller than a virtual line 17 when the speed of the vehicle 1 is greater than or equal to the predetermined speed.

The vehicle 1 may be set the virtual line 16 when the curvature of the road on which the vehicle 1 drives is less than or equal to the predetermined curvature to be smaller than the virtual line 17 when the curvature is greater than or equal to the predetermined curvature.

The vehicle 1 may predict a low risk of collision by setting the virtual line 16 to be small when the speed of the vehicle 1 is less than the predetermined speed.

When the curvature of the road on which the vehicle 1 drives is less than or equal to the predetermined curvature, the vehicle 1 may predict the low risk of collision by setting the virtual line 17 to be small.

Figure 5:
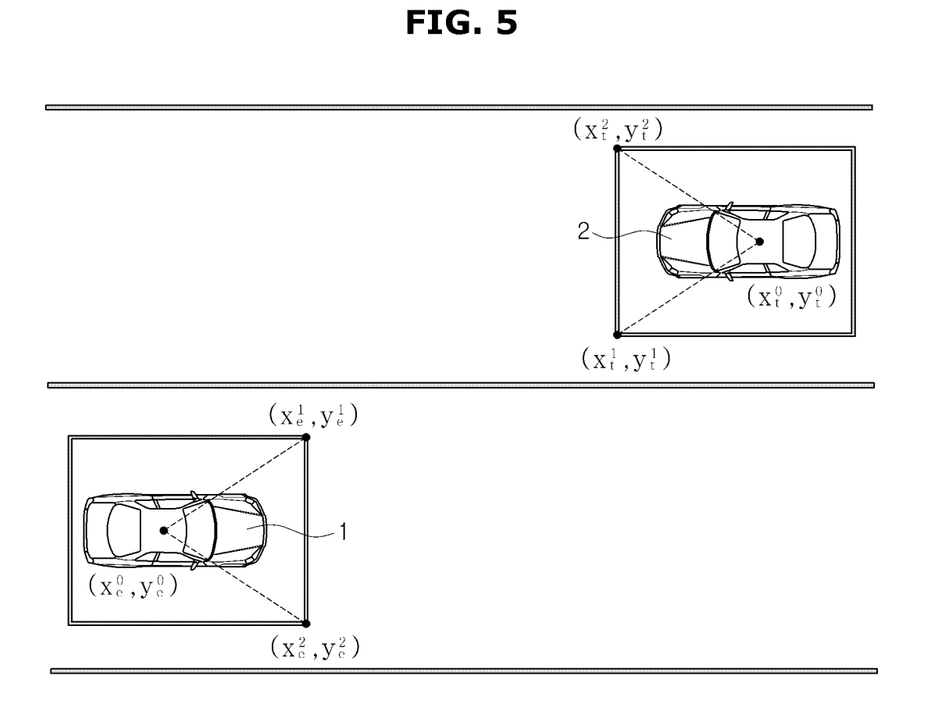
FIG. 5 is a view illustrating a method of calculating a distance between a vehicle and a surrounding vehicle according to another embodiment of the disclosure.

FIG. 5 is a view illustrating a method of calculating a distance between a vehicle and a surrounding vehicle according to another embodiment of the disclosure.

Referring to FIG. 5, the vehicle 1 may set the virtual point and the virtual line based on the coordinates based on outer geometry information of the vehicle 1.

The vehicle 1 may set the first virtual line on the outskirts of the vehicle 1, set first virtual points (Xe1, Ye1) and (Xe2, Ye2) at the outermost of the first virtual line, and set a first virtual point (Xe0, Ye0) at a point corresponding to a center of gravity of the vehicle 1. In the embodiment of the disclosure, the number of first virtual points is set to three, but the number is not particularly limited.

For example, the vehicle 1 may calculate the coordinates of the first virtual points (Xe0, Ye0), (Xe1, Ye1), and (Xe2, Ye2) using at least one of the first full width information of the vehicle 1, the lane width information of the road on which the vehicle 1 drives, and the position information of the vehicle 1.

In this case, the vehicle 1 may calculate the distance between the vehicle 1 and the both lanes based on the first virtual points (Xe1, Ye1) and (Xe2, Ye2).

The vehicle 1 may set the second virtual line on the outskirts of the surrounding vehicle 2 driving in a direction opposite to the vehicle 1, set second virtual points (Xt1, Yt1) and (Xt2, Yt2) at the outermost of the second virtual line, and set a second virtual point (Xt0, Yt0) at a point corresponding to a center of gravity of the surrounding vehicle 2. In the embodiment of the disclosure, the number of second virtual points is set to three, but the number is not particularly limited.

For example, the vehicle 1 may calculate the coordinates of the second virtual points (Xt0, Yt0), (Xt1, Yt1), and (Xt2, Yt2) using at least one of the first full width information of the surrounding vehicle 2, the lane width information of the road on which the surrounding vehicle 2 drives, or the position information of the surrounding vehicle 2.

In this case, the vehicle 1 may calculate the distance between the surrounding vehicle 2 and the both lanes based on the second virtual points (Xt1, Yt1) and (Xt2, Yt2).

The vehicle 1 may calculate a distance between the first virtual point (Xe1, Ye1) of the vehicle 1 and the second virtual point (Xt1, Yt1) of the surrounding vehicle 2.

Figure 6:
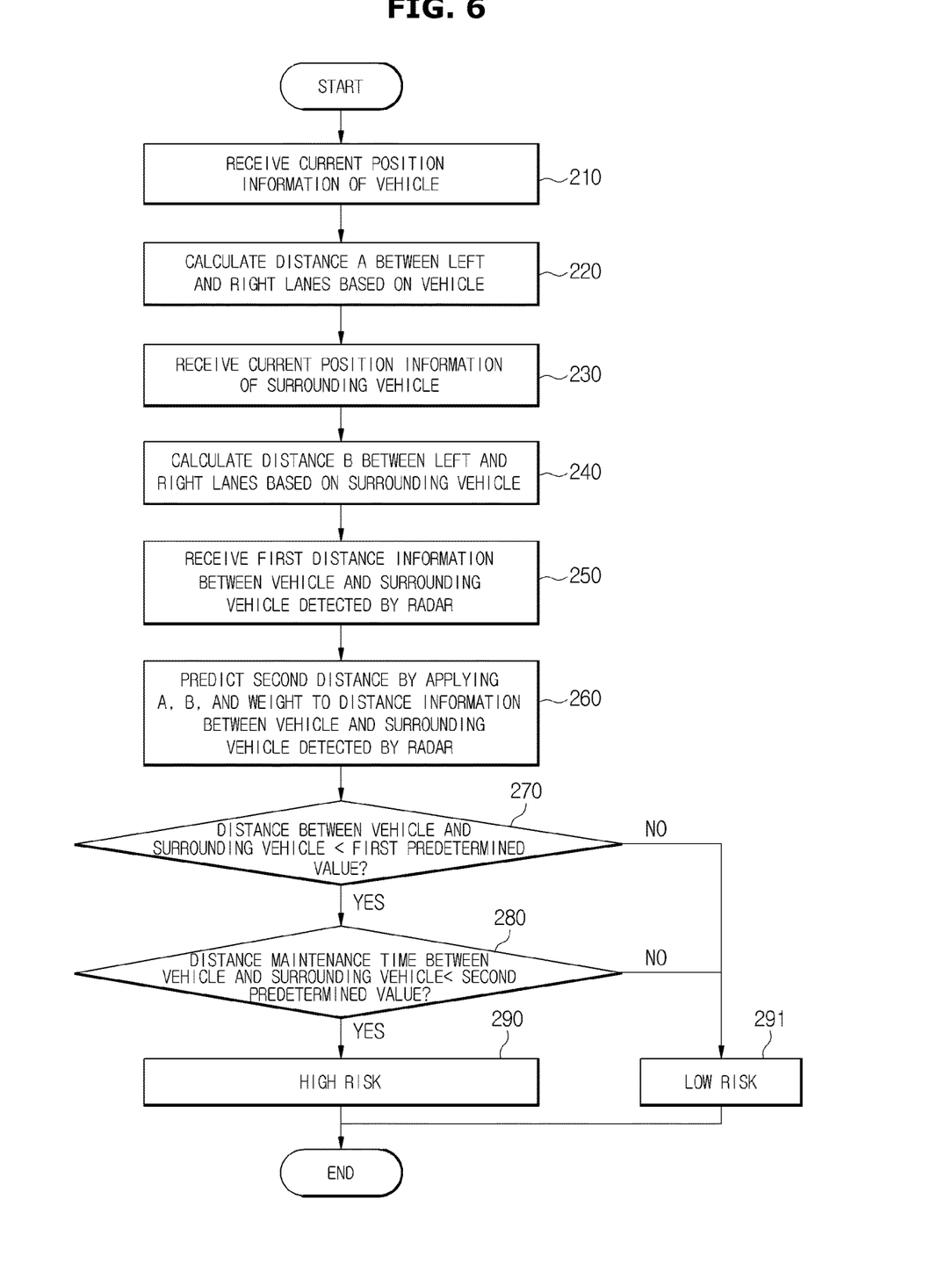
FIG. 6 is a flowchart illustrating a method of predicting a risk of collision of a vehicle according to another embodiment of the disclosure.

FIG. 6 is a flowchart illustrating a method of predicting a risk of collision of a vehicle according to another embodiment of the disclosure.

The vehicle 1 may receive the current position information of the vehicle 1 from the detector 110 (210).

The vehicle 1 may calculate the distance A between the left and right lanes of the road on which the vehicle 1 drives based on the vehicle 1 (220).

In more detail, the vehicle 1 may set the first virtual line on the outskirts of the vehicle 1 and may set the first virtual point along the outskirts of the vehicle 1. Here, the vehicle 1 may calculate the distance A between the vehicle 1 and the left lane and the right lane of the road on which the vehicle 1 drives, respectively, using the received current position information of the vehicle 1, the first full width information of the vehicle 1, the first virtual line, and the first virtual point.

The vehicle 1 may receive the current position information of the surrounding vehicle 2 from the surrounding vehicle 2 (230).

The vehicle 1 may calculate the distance B between the left and right lanes of the road on which the surrounding vehicle 2 drives based on the surrounding vehicle 2 (240).

In more detail, the vehicle 1 may set the second virtual line on the outskirts of the surrounding vehicle 2 and may set the second virtual point along the outskirts of the surrounding vehicle 2. Here, the vehicle 1 may calculate the distance B between the surrounding vehicle 2 and the left lane and the right lane of the road on which the surrounding vehicle 2 drives, respectively, using the received current position information of the surrounding vehicle 2, the second full width information of the surrounding vehicle 2, the second virtual line, and the second virtual point.

The vehicle 1 may receive the first distance information corresponding to the first distance between the vehicle 1 and the surrounding vehicle 2 detected by the radar of the vehicle 1 (250).

The vehicle 1 may predict the second distance by applying A, B, and the weight to the first distance (260).

In more detail, when the surrounding vehicle 2 is driving in the left lane based on the vehicle 1, the vehicle 1 may calculate the distance A between the vehicle 1 and the left lane. The vehicle 1 may calculate the distance B between the surrounding vehicle 2 and the right lane, and calculate the sum A+B of the distance A between the vehicle 1 and the left lane and the distance B between the surrounding vehicle 2 and the right lane. In this case, the vehicle 1 may apply the weight to the sum A+B of the calculated distances.

For example, when the distance A between the vehicle 1 and the left lane is 1 meter, the distance B between the surrounding vehicle 2 and the right lane is 1 meter, the weight is 0.5, and the distance corresponding to the first distance is 10 meters, the second distance may be calculated as 10+0.5*(1+1)=11.

The vehicle 1 may compare the second distance between the vehicle 1 and the surrounding vehicle 2 with the first predetermined value (270).

When the second distance is greater than the first predetermined value, the vehicle 1 may determine that the second distance between the vehicle 1 and the surrounding vehicle 2 is large, and predict that the risk of collision of the vehicle 1 and the surrounding vehicle 2 is low (291).

When the second distance is less than the first predetermined value, the vehicle 1 may determine whether the distance between the vehicle 1 and the left lane and the vehicle 1 and the right lane is maintained for the predetermined time based on the vehicle 1 (280).

When it is determined that the second distance is maintained for the predetermined time, the vehicle 1 may determine that the second distance between the vehicle 1 and the surrounding vehicle 2 is maintained small, and thus may predict that the risk of collision is high (290).

Figure 7:
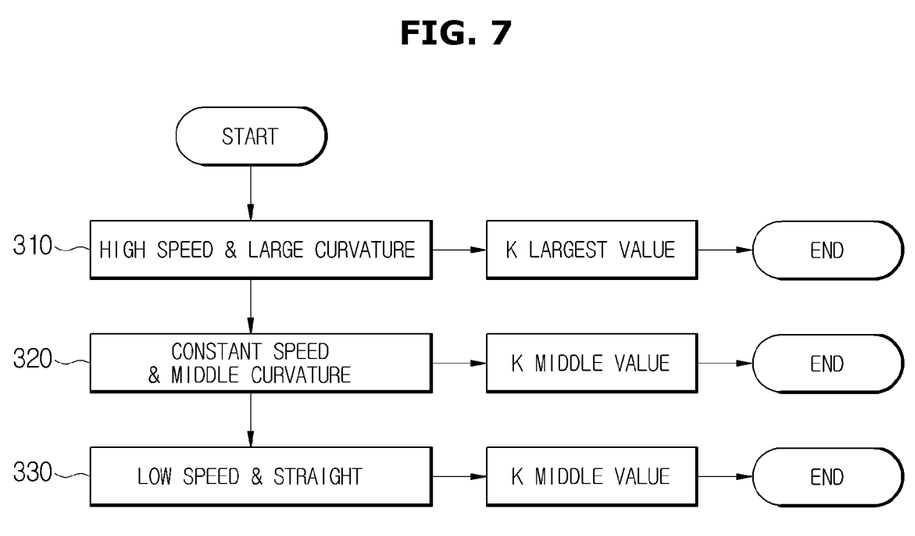
FIG. 7 is a flowchart illustrating a method of predicting a risk of collision of a vehicle according to another embodiment of the disclosure.

FIG. 7 is a flowchart illustrating a method of predicting a risk of collision of a vehicle according to another embodiment of the disclosure.

When the speed of the vehicle 1 is greater than the predetermined speed, and when the curvature of the road on which the vehicle 1 drives is greater than the predetermined curvature, the vehicle 1 may set the weight to a largest value (310).

When the speed of the vehicle 1 is equal to the predetermined speed, and when the curvature of the road on which the vehicle 1 drives is equal to the predetermined curvature, the vehicle 1 may set the weight to an intermediate value (320).

When the speed of the vehicle 1 is less than the predetermined speed, and when the curvature of the road on which the vehicle 1 drives is less than the predetermined curvature, the vehicle 1 may set the weight to the intermediate value (330).

Here, the largest value may refer to a value larger than the intermediate value, and may be the predetermined value.

According to the embodiments of the disclosure, by calculating the distance between the vehicle and the surrounding vehicle using the full width of the vehicle, there is an effect of more accurately calculating the distance between the vehicle and the surrounding vehicle.

In addition, by applying a weight to the distance between the vehicle and both lanes of the lane in which the vehicle is driving according to the vehicle speed and the curvature of the road, it is possible to more accurately predict the risk of collision.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a non-transitory computer-readable recording medium.

The non-transitory computer-readable recording medium may include all types of recording media storing commands that may be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
    a detector configured to detect a position of the vehicle and a first distance between the vehicle and a surrounding vehicle; and
    a controller configured to:
        calculate, using the position of the vehicle and first lane width information of a first lane in which the vehicle drives, a distance between the vehicle and a left line of the first lane and a distance between the vehicle and a right line of the first lane,
        calculate, using a position of the surrounding vehicle and second lane width information of a second lane in which the surrounding vehicle drives, a distance between the surrounding vehicle and a left line of the second lane and a distance between the vehicle and a right line of the second lane,
        calculate a second distance between the vehicle and the surrounding vehicle based on the calculated distances between the vehicle and at least one of the left and right lines of the first lane, respectively, and the calculated distances between the surrounding vehicle and at least one of the left and right lines of the second lane, respectively, added to the first distance, and
        predict a risk of collision between the vehicle and the surrounding vehicle based on the second distance.

2. The vehicle according to claim 1, wherein the controller is configured to:
    calculate the distances between the vehicle and the left and right lines of the first lane, respectively, using first full width information of the vehicle, and
    calculate the distances between the surrounding vehicle and the left and right lines of the second lane, respectively, using second full width information of the surrounding vehicle.

3. The vehicle according to claim 1, wherein the controller is configured to apply a weight to the distances between the vehicle and at least one of the left and right lines of the first lane, respectively, and the distances between the surrounding vehicle and at least one of the left and right lines of the second lane, respectively.

4. The vehicle according to claim 3, wherein the controller is configured to determine the weight using at least one of a vehicle speed or a curvature of the road.

5. The vehicle according to claim 1, wherein the controller is configured to:
    calculate the distances between the vehicle and the left and right lines of the first lane, respectively, by setting at least one of a first virtual line or a first virtual point on outskirts of the vehicle, and
    calculate the distances between the surrounding vehicle and the left and right lines of the second lane, respectively, by setting at least one of a second virtual line or a second virtual point on outskirts of the surrounding vehicle.

6. The vehicle according to claim 5, wherein the controller is configured to:
    automatically set lengths of the first virtual line and the second virtual line, respectively, based on the vehicle speed, and
    set the lengths of the first virtual line and the second virtual line, respectively, when the vehicle speed is less than or equal to a predetermined speed to be smaller than those when the vehicle speed is greater than or equal to the predetermined speed.

7. The vehicle according to claim 5, wherein the controller is configured to set the lengths of the first virtual line and the second virtual line, respectively, when a curvature of the road on which the vehicle drives is less than or equal to a predetermined curvature to be smaller than those when the curvature of the road is greater than or equal to the predetermined curvature.

8. The vehicle according to claim 1, wherein the controller is configured to predict that the risk of collision to be less than a threshold in a case where the second distance is greater than a first predetermined value.

9. The vehicle according to claim 1, wherein the controller is configured to determine whether the distance between the vehicle and the left line and the distance between the vehicle and the right line are maintained for a predetermined time based on the vehicle in a case where the second distance is less than a first predetermined value.

10. The vehicle according to claim 9, wherein the controller is configured to predict that the risk of collision is higher than a threshold in a case where the distance to the between the vehicle and the left line and the distance between the vehicle and the right line are maintained for the predetermined time.

11. A method of controlling a vehicle, the method comprising:
    detecting a position of a vehicle and a first distance between the vehicle and a surrounding vehicle using a radar;
    calculating, by a controller, distances between the vehicle and right and left lines of a first lane, respectively, in which the vehicle drives, using the position of the vehicle and first lane width information of the first lane;
    calculating, by the controller, distances between the surrounding vehicle and left and right lines of a second lane, respectively, in which the surrounding vehicle drives using a position of the surrounding vehicle and second lane width information of the second lane;
    calculating, by the controller, a second distance between the vehicle and the surrounding vehicle based on the calculated distances between the vehicle and at least one of the right and left lines of the first lane, respectively, and the calculated distances between the surrounding vehicle and at least one of the right and left lines of the second lane, respectively, added to the first distance; and
    predicting, by the controller, a risk of collision between the vehicle and the surrounding vehicle based on the second distance.

12. The method according to claim 11, further comprising:
- calculating, by the controller, the distances between the vehicle and the left and right lines of the first lane, respectively, using first full width information of the vehicle; and
- calculating, by the controller, the distances between the surrounding vehicle and the left and right lines of the second lane, respectively, using second full width information of the surrounding vehicle.

13. The method according to claim 11, further comprising applying, by the controller, a weight to the distances between the vehicle and at least one of the left and right lines of the first lane, respectively, and the distances between the surrounding vehicle and at least one of the left and right lines of the second lane, respectively.

14. The method according to claim 13, further comprising determining, by the controller, the weight using at least one of a vehicle speed or a curvature of the road.

15. The method according to claim 11, further comprising:
- calculating, by the controller, the distances between the vehicle and the left and right lines of the first lane, respectively, by setting at least one of a first virtual line or a first virtual point on outskirts of the vehicle; and
- calculating, by the controller, the distances between the surrounding vehicle and the left and right lines of the second lane, respectively, by setting at least one of a second virtual line or a second virtual point on outskirts of the surrounding vehicle.

16. The method according to claim 15, further comprising:
- automatically setting, by the controller, lengths of the first virtual line and the second virtual line, respectively, based on the vehicle speed; and
- setting, by the controller, the lengths of the first virtual line and the second virtual line, respectively, when the vehicle speed is less than or equal to a predetermined speed to be smaller than those when the vehicle speed is greater than or equal to the predetermined speed.

17. The method according to claim 15, further comprising setting, by the controller, the lengths of the first virtual line and the second virtual line when a curvature of the road on which the vehicle drives is less than or equal to a predetermined curvature to be smaller than those when the curvature of the road is greater than or equal to the predetermined curvature.

18. The method according to claim 11, further comprising predicting, by the controller, that the risk of collision is less than a threshold in a case where the second distance is greater than a first predetermined value.

19. The method according to claim 11, further comprising determining, by the controller, whether the distances between the vehicle and the left and right lines of the first lane, respectively, are maintained for a predetermined time in a case where the second distance is less than a first predetermined value.

20. The method according to claim 19, further comprising predicting, by the controller, that the risk of collision is higher than the threshold upon determining that the distances between the vehicle and the left and right lines of the first lane, respectively, are maintained for the predetermined time.

* * * * *